(No Model.)

3 Sheets—Sheet 1.

H. WIESE.
FEED CUTTER.

No. 432,845.

Patented July 22, 1890.

ATTEST.
J. Henry Kaiser
Chas. E. Hunt

INVENTOR.
Henry Wiese
by Franck D. Johns
Attorney (No Model.) 3 Sheets—Sheet 2.

H. WIESE.
FEED CUTTER.

No. 432,845. Patented July 22, 1890.

ATTEST
J. Henry Kaiser
Chas. E. Hunt

INVENTOR.
Henry Wiese
by Franck D. Johns
Attorney (No Model.) 3 Sheets—Sheet 3.

H. WIESE.
FEED CUTTER.

No. 432,845. Patented July 22, 1890.

ATTEST.
J. Henry Kaiser.
Chas. E. Hunt.

INVENTOR.
Henry Wiese
by Franck D. Johns
Attorney

United States Patent Office.

HENRY WIESE, OF FORT WAYNE, INDIANA.

FEED-CUTTER.

SPECIFICATION forming part of Letters Patent No. 432,845, dated July 22, 1890.

Application filed June 10, 1889. Serial No. 313,692. (No model.)

*To all whom it may concern:*

Be it known that I, HENRY WIESE, a citizen of the United States, residing at Fort Wayne, in the county of Allen and State of Indiana, have invented certain new and useful Improvements in Feed-Cutters; and I do hereby declare the following to be a full, clear, and exact description of the invention, such as will enable others skilled in the art to which it appertains to make and use the same.

My invention relates to improvements in feed-cutters; and it consists in certain novelty in the construction, arrangement, and combination of the various parts, all of which I will now proceed to point out and describe, reference being had to the accompanying drawings, in which—

Figure 1:
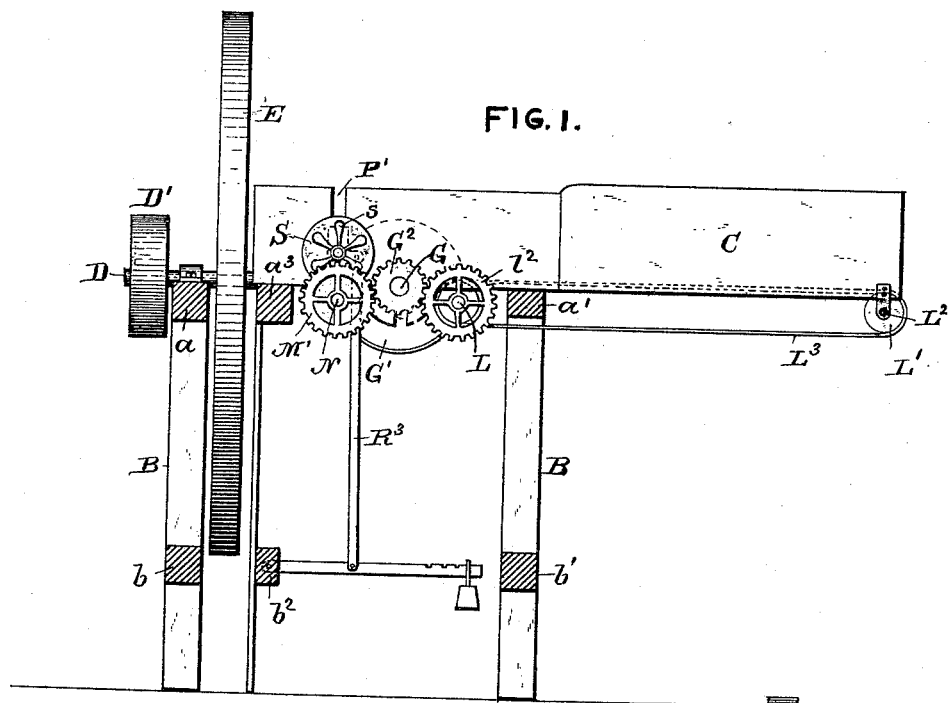
Figure 2:
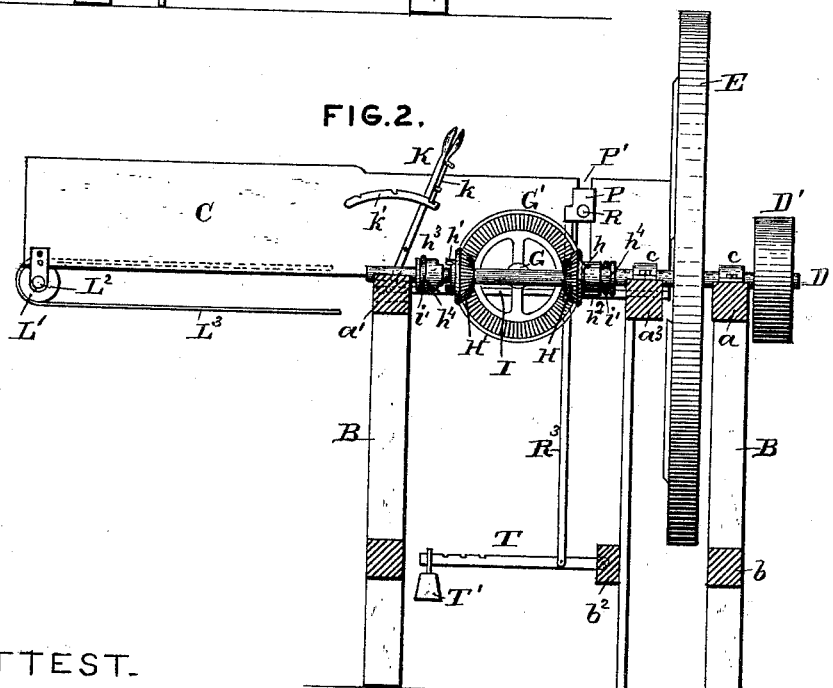
Figure 3:
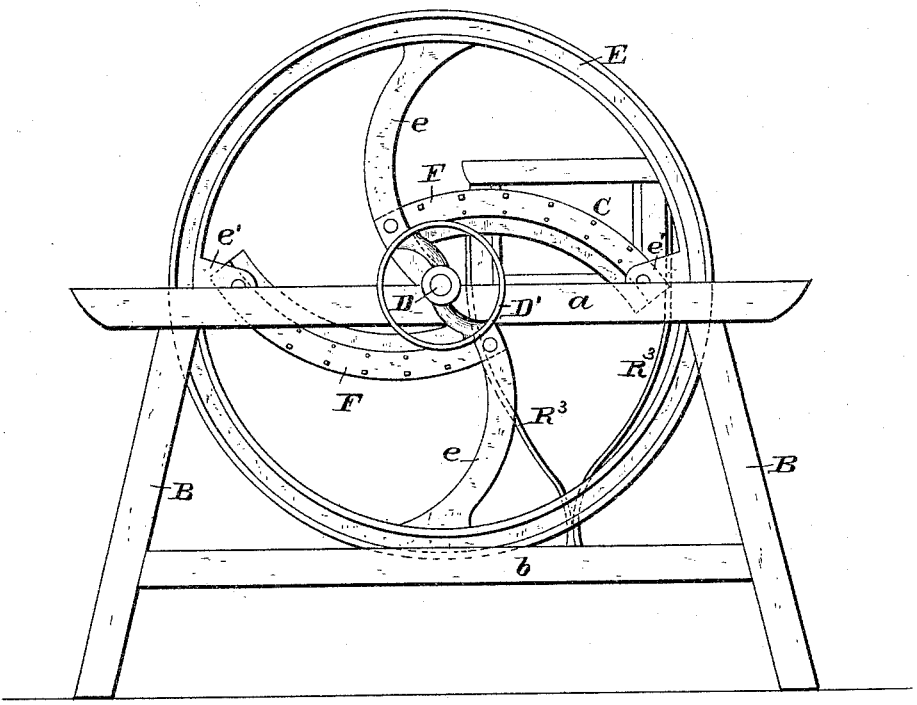
Figure 4:
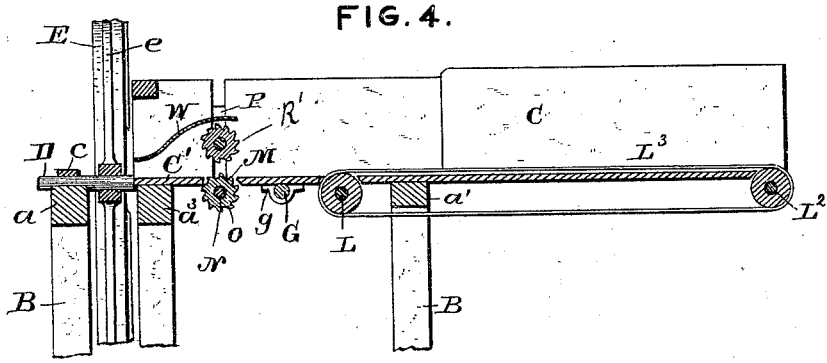
Figure 5:
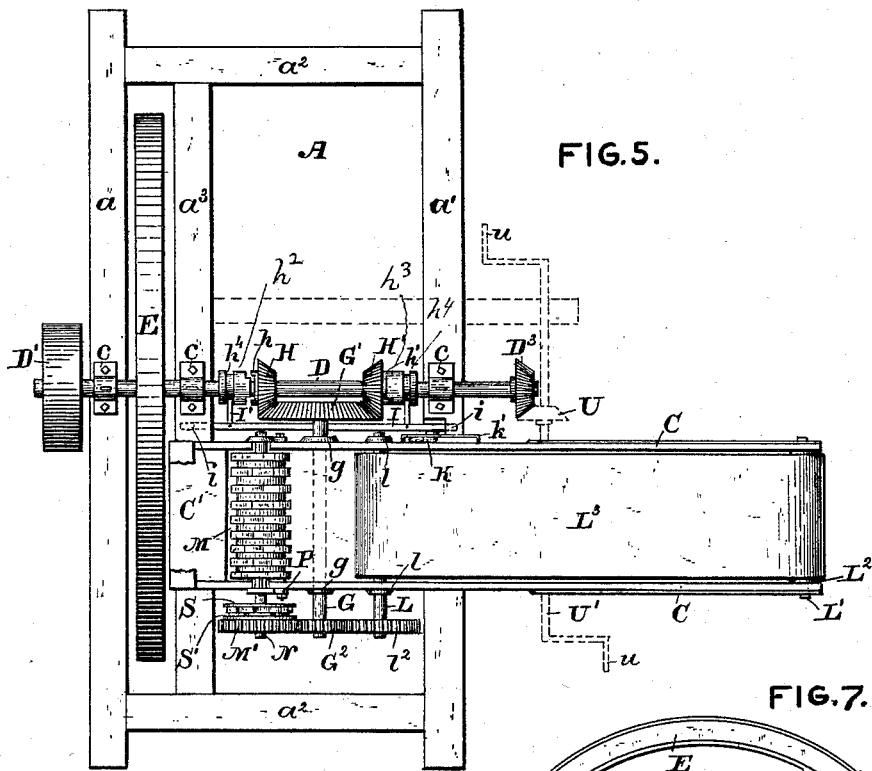
Figure 6:
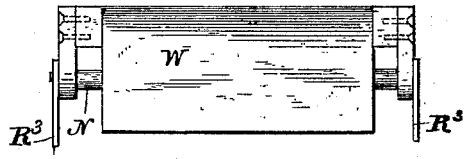
Figures 8, 9:
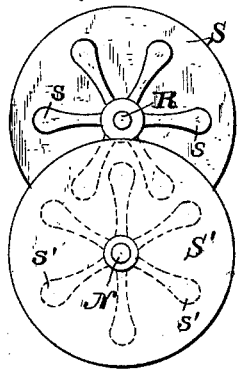

Figure 1 is a side elevation of a feed-cutter embodying my invention; Fig. 2, a side elevation of the opposite side of the cutter from that shown in Fig. 1. Fig. 3 is an end elevation; Fig. 4, a longitudinal section; Fig. 5, a top plan view, and Figs. 6, 7, 8, 9, and 10 are details of various parts of my said invention.

Referring to said drawings, A represents a rectangular horizontal frame composed of the end bars $a\ a'$, side bars $a^2$, and a transverse bar $a^3$, which is parallel with the forward end bar $a$. Said frame is supported upon suitable uprights B, connected near their lower ends by the bars $b$, $b'$, and $b^2$.

C is the feed-trough mounted on the frame and provided with the steel mouth-piece or throat-plate C′, which projects slightly beyond the bar $a^3$.

D is the main shaft mounted in bearings $c$ on the frame and extending across the same parallel with the feed-trough.

D′ is a pulley on the forward end of said shaft, by means of which it may be connected with suitable power for driving the cutter.

E is a balance or cutter wheel mounted on the shaft D in the space between the bars $a$ and $a^3$. Said wheel is provided with two curved spokes $e$, the curvature of which is the same as the curvature of the cutting-knives employed.

$e'\ e'$ are diametrically-opposite and inwardly-projecting lugs on the inner side of the rim of the wheel.

Figure 7:
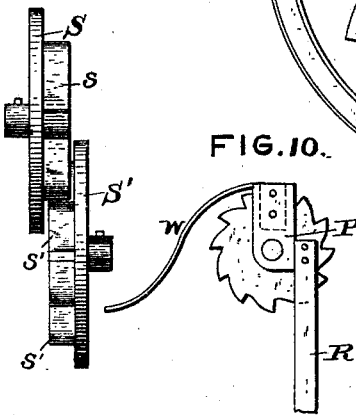
Figure 10:
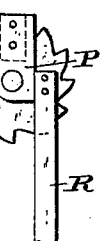

The letter F indicates the cutting-knives, which, as above stated, are of a curvature corresponding to the curvature of the spokes of the wheel. The said knives are secured at one end to the lugs $c'$ and at the other to the spokes, as shown in Fig. 3 of the drawings, in which instance the knives are shown as provided with cutting-edges on their inner or concave curves. In some cases, however, where it is desired to have the knives arranged with their cutting-edges on the outer or convex curve of the blades, the wheel may be reversed on its shaft and the knives secured directly and wholly to the spokes, as shown in Fig. 7 of the drawings. The knives in either case are attached to the side of the wheel facing the mouth of the feed-throat, so as to work closely against it in order to insure the perfect cutting of the feed.

Two sets of interchangeable cutting-knives are employed with the machine, corresponding in number to the spokes of the balance-wheel, one set having their cutting-edges at the convex and the other at the concave curves, one set, it is evident, being used at a time.

G is a shaft mounted in bearings $g$, secured to each side of the feed-trough and extending under and across said trough, said shaft being at right angles to the shaft D.

G′ is a bevel-gear mounted on the end of said shaft G next to the shaft D.

H H′ are bevel-pinions loosely mounted on the shaft D on opposite sides of the gear G′, and engaging with the same at diametrically-opposite points. Said pinions are formed with clutch-sections $h\ h'$ on their outer sides.

$h^2$ is a clutch-section splined on the shaft D and adapted to engage with the clutch-section $h$ on the pinion H.

$h^3$ is a clutch-section splined on said shaft D and adapted to engage with the clutch-section $h'$ on the pinion H′. Said clutch-sections $h^2\ h^3$ are formed with annular grooves $h^4$.

I is a rod mounted in bearings $i$ in the frame and extending parallel with the shaft D.

I′ I′ are arms extending from said rod I, and having on their ends collars $i'$, which engage with the annular grooves $h^4$ in the clutch-sections $h^2\ h^3$.

K is a lever pivoted to the side of the feed-trough and pivotally connected with the rod I. Said lever is provided with a spring-actuated dog $k$, which engages with a toothed segment $k'$ and serves to hold the lever as adjusted. By means of this lever both of the clutch-sections may be disengaged from the pinions, or they may be alternately thrown in or out of engagement with the pinions H H', so as to change the movement of the shaft G, for a purpose hereinafter set forth.

L is a shaft mounted in bearings $l$ on the under side of the feed-trough, and L' is a similar shaft mounted in bearings $l'$ at the outer end of said feed-trough. Said shafts extend across said feed-trough and are parallel with the shaft G.

$L^2$ are rollers mounted on the shafts L L', on which is mounted the endless feed-carrier $L^3$. Said carrier forms the bottom of the rear portion of the trough.

$l^2$ is a gear secured on the end of the shaft L, which engages with a pinion $G^2$ on the shaft G.

M is a transverse rectangular aperture formed in the bottom of the feed-trough, near the mouth of said trough.

N is a shaft mounted in bearings on the sides of the trough, and extends under and across the same below the aperture M.

O is the lower feed-roller mounted on the shaft N and projecting up through the aperture M slightly above the bottom of said trough.

M' is a gear on the shaft N, which engages with the pinion $G^2$.

P are loose bearings mounted and sliding in vertical guides or slots P', formed in the sides of the trough directly over the shaft N. In said bearings is journaled a shaft R, on which is mounted the upper feed-roller R'. On one end of the shaft R is secured a disk S, having formed on its outer face long spur-gear teeth $s$.

S' is a similarly-formed disk mounted on the shaft N between the gear M' and trough. Said disk is of the same size as the disk S, and has long spur-gear teeth S' on its inner face which engage with the gear-teeth on the disk S, the length of the teeth permitting the upper feed-roller to be moved up or down, as hereinafter described, and still keep the spur-gears in engagement. It will thus be seen that the upper roller is operated through the intermediate connection with the shaft of the lower roller so as to effect the feeding of the material to be cut.

Secured to each of the loose bearings are depending rods or arms $R^3$, which are pivotally connected with lever-arms T, one end of which are pivoted to the frame and are provided on their free ends with adjustable weights T'. Said weights cause the upper feed-roller to bear down upon the material as it passes between the rollers, so as to compress the material and also effect a steady feed and prevent it from choking between the rollers and cutter, the degree of pressure being regulated by adjusting the weights to or from the fulcrum of the levers. If desired, the lower ends of the depending rods $R^3$ may be connected by a transverse bar and but one weighted lever used, which would then be pivotally connected with said transverse bar. The loose bearings P are extended above the upper roller and are connected by a downwardly-curved feed-compressor W, which extends entirely across and out to the end of the mouth of the trough. As the material to be cut passes through the rollers it is compressed by said compressor and prevented from choking between said rollers and the cutting-knives. The shaft D is extended beyond the rear of the frame and has on its end a bevel-gear $D^3$, which engages with a bevel-gear U, mounted on a shaft U', provided with handles $u$, so that hand-power may be used to operate the machine, if desired.

The operation of my invention will be readily understood in connection with the above description, and is as follows: When the clutch-section $h^3$ is in engagement with the clutch-section $h'$ on the pinion H and the shaft D is in motion, the carrier is operated so as to feed the material forward to the feed-rollers, and through the said rollers to the cutting-knives. By means of the lever K the clutch-sections $h^2$ and $h^3$ may be both disengaged from the pinions H and H', so as to stop the operation of the feed mechanism; or the lever may be moved into position, so as to throw the clutch-sections $h^2$ and $h$ into engagement, which will reverse the movement of the carrier and feed-rollers to convey the material away from the cutting-knives.

Having thus fully described my invention, I claim as new and desire to secure by Letters Patent—

In a feed-cutter, the combination, with a frame, a feed-trough supported thereon, a main driving-shaft D, mounted on the frame parallel with the feed-trough and carrying a balance-wheel provided with knives and adapted to rotate in front of the feed-trough, of a shaft G, mounted at right angles to the shaft D, suitable shafts carrying upper and lower feed-rollers and mounted in bearings in the sides of the feed-trough, intermediate mechanism connecting said rollers with the shaft G, an endless-belt feed-carrier mounted on suitable rollers, intermediate mechanism connecting said rollers with said shaft G, a bevel-gear G', mounted on the end of the shaft G, next to said shaft D, bevel-pinions H H', loosely mounted on the shaft D and engaging with the gear G' at diametrically-opposite points and having clutch-sections on their outer sides, clutch-sections $h^2$ $h^3$, splined to the shaft D and adapted to engage with the clutch-sections on the pinions, a lever connected with said clutch-sections, whereby they may alternately be thrown into engagement with the pinions, or may both be disengaged from said pinions, all constructed, arranged, and operating substantially as shown and described, as and for the purpose set forth.

In testimony whereof I affix my signature in presence of two witnesses.

HENRY WIESE.

Witnesses:
T. E. ELLISON,
CHAS. W. KUHNE.